(12) United States Patent
Skalecki et al.

(10) Patent No.: US 6,914,912 B1
(45) Date of Patent: Jul. 5, 2005

(54) ROUTE SELECTION FOR ALTERNATE PATHS IN CONNECTION-ORIENTED NETWORKS

(75) Inventors: Darek R. Skalecki, Kanata (CA); Peter J. Ashwood-Smith, Hull (CA); Donald Fedyk, Groton, MA (US)

(73) Assignee: Nortel Networks Limited, St. Laurent (CA)

( * ) Notice: Subject to any disclaimer, the term of this patent is extended or adjusted under 35 U.S.C. 154(b) by 766 days.

(21) Appl. No.: 09/636,701

(22) Filed: Aug. 11, 2000

(51) Int. Cl.[7] ............................. H04J 3/22; H04J 3/14
(52) U.S. Cl. ..................... 370/468; 370/238.1; 709/239
(58) Field of Search ............................. 370/237–238.1, 370/468, 252–255, 389–400, 218–228; 340/825.01, 2.1, 2.23; 709/239; 714/41

(56) References Cited

U.S. PATENT DOCUMENTS

| | | | |
|---|---|---|---|
| 5,805,578 A | * 9/1998 | Stirpe et al. | 714/4 |
| 5,825,772 A | 10/1998 | Dobbins et al. | 370/396 |
| 5,832,197 A | 11/1998 | Houji | 395/182.02 |
| 5,848,055 A | 12/1998 | Fedyk et al. | 370/228 |
| 5,856,981 A | * 1/1999 | Voelker | 714/712 |
| 5,953,312 A | 9/1999 | Crawley et al. | 370/218 |
| 5,987,516 A | 11/1999 | Rao et al. | 709/227 |
| 6,028,862 A | 2/2000 | Russell et al. | 370/397 |
| 6,034,961 A | * 3/2000 | Masuo et al. | 370/219 |
| 6,112,249 A | * 8/2000 | Bader et al. | 714/4 |
| 6,167,025 A | * 12/2000 | Hsing et al. | 370/216 |
| 2001/0033548 A1 | * 10/2001 | Saleh et al. | 370/218 |

OTHER PUBLICATIONS

Awduche, Daniel O., et al., "Multi–Protocol Lambda Switching: Combining MPLS Traffic Engineering Control With Optical Crossconnects," Nov. 1999.

* cited by examiner

Primary Examiner—Steven HD Nguyen

(57) ABSTRACT

A process for selecting the best possible route for an alternate communications path in connection-oriented networks takes into account the reserved network resources and the set of links and/or nodes used by a current communications path. Whenever a request for route selection includes the resources reserved by the current communications path, the alternate communications path is computed considering the network resources reserved by the current communications path as available, in addition to the available network resources existing in the topology database.

In another embodiment of the invention, the topology database is initially modified such that the network resources reservations used by the current communications path are removed from the topology database. The alternate communications path is then computed. Finally, the topology database is restored to reflect again the network resources reservations used by the current communications path.

The method according to the invention improves network utilization since it is based on a realistic network resources allocation and connection management. The longevity connection and the capacity of the network are increased allowing for more connection-oriented services to be deployed in the network.

29 Claims, 3 Drawing Sheets

ROUTE SELECTION FOR ALTERNATE PATHS IN CONNECTION-ORIENTED NETWORKS

BACKGROUND OF THE INVENTION

1. Field of Invention

The present invention generally relates to applications for connection-oriented packet switching networks, and in particular to a method of route selection for alternate paths in connection-oriented networks.

2. Related Art

Routed networks operate by forwarding packets between a source and a destination using intermediate routers which examine the address of a packet and forward the packet to another router until it reaches the destination. Routed networks such as Internet, provide a highly developed addressing structure through which systems can communicate with each other. However, due to routing and queuing delays,in routed networks, and also due to the increasing demand for real-time traffic, to support traffic with widely varying speeds, delay tolerances and connection longevities over a single integrated network becomes a challenging engineering issue.

Connection-oriented networks, e.g. asynchronous transfer mode (ATM) networks, multi-protocol label switched (MPLS) networks, or relay networks, operate by initially establishing a connection between the source and the destination using the physical layer circuit, and then transfer the data without computing overhead, routing and queuing delays associated with the routed networks.

In a connection-oriented packet switching network (or path-oriented routing network), the source to destination path for a packet is determined when a connection is set up, and may or may not be fixed for the duration of the connection. It may not be fixed due to network component failures (links, nodes, etc) requiring the path to be changed to route around the failures. Other mechanisms may also change the path, such as path optimization or path modification.

During path establishment, the requested network resources (bandwidth, memory, CPU, etc) for a particular connection are reserved in advance on links and/or nodes along the selected route in order to ensure that there will be enough of these resources during data transfer. These reservations prevent over utilizations of links and/or nodes. Once links and/or nodes have reached their resources capacities, paths have to be established along different routes. This may lead to using less efficient routes, or bumping of lower priority traffic to accommodate higher priority traffic.

It is through resources reservations that connection-oriented networks eliminate, or at least limit queuing delays associated with the routed networks enabling them to better support traffic with widely varying speeds, delay tolerances and connection longevities over a single integrated network. Through resources reservations connections are guaranteed a requested level of service provided by the connection-oriented network.

As mentioned before, two common mechanisms available in connection-oriented networks for purposes of efficient network resources management and connection management are path optimization and path modification.

Path optimization is a mechanism where a path is rerouted from a less optimal route to a more optimal route. In the spirit of efficient network resources management, optimality may be related to the total amount of network resources that the path is reserving. In such a case, a more optimal route is a route where the total amount of reserved resources is smaller than the amount reserved on the less optimal route.

Path modification is a mechanism where path's attributes such as resources (bandwidth, memory, CPU, etc) requirements are modified, which may result in the path being rerouted, especially in the case when these requirements are increased.

It is known that traffic loss and interruptions associated with the implementation of these two mechanisms may be minimized by utilizing a technique known as "make-before-break" in MPLS and PNNI (private network-network interface) networks. This technique includes the creation of an alternate communications path while the current communications path carries data. Traffic is then switched to the alternate path thus making the alternate path current.

It is to be noted that resources for the alternate communications path must be reserved in advance on all links and/or nodes along its route, while at the same time the current communications path continues to maintain its resources reservations. A potential multiple reservations of resources on links and/or nodes common to both alternate and current communications paths is an unnecessary waste of network resources and may be prevented using the method disclosed in U.S. Pat. No. 5,848,055 issued on Dec. 8, 1998, and assigned to Nortel Networks.

The reason the "make-before-break" method allows a single resources reservations for both alternate and current paths on common links and/or nodes, is that only one of these paths can carry traffic at a particular instance of time, except for a brief period following the traffic switch from the current to the alternate path.

FIG. 1 illustrates a portion of a network having nodes A to F and associated links AB, to FE, each link having a capacity of 1 Mbitts. Suppose a connection requiring 600 Kbits/s is required between nodes A and F. A current communications path of 600 Kbit's between source node A and destination node F is established through links AB, BC, CE and EF, shown in double lines in FIG. 1. The links forming the current communications path are identified in the topology database having 400 Kbit's as available resources. Alternatively, the topology database may indicate that 600 Kbit/s is reserved on these links. The representation of available versus reserved resources does not alter the spirit of the invention, and for the purpose of the example of FIG. 1 the representation of available resources is chosen.

Continuing with the example of FIG. 1, suppose a path optimization mechanism based on "make-before-break" technique is implemented in this network. Suppose that route AC, CE, EF for the connection is more optimal than route AB, BC, CE, EF currently used by the connection's original path. The path optimization mechanism has to learn the more optimal route for an alternate communications path, then needs to establish the alternate path, switch traffic from the current communications path to the alternate path and terminate the original current path and leaving the alternate path as the new current path. The mechanism can only learn the existence of the more optimal route by using the services of a route selection process.

Route selection in connection-oriented networks is typically performed at a source node and through the use of a topology database which contains resources (bandwidth, memory, CPU, etc) information for all links and/or nodes. The information may either indicate the amount of the resources available, or the amount of the reserved resources on such links and/or nodes. Typically, the amount of reserved or available network resources is stored in the topology database in an aggregate form. That is, the total amount of network resources reserved or available is known for all connections, but not on a per connection basis. This ensures topology databases are of a manageable size. The algorithm typically used by route selection process for computing the best route from source to destination is based on Dijkstra shortest-path-first algorithm where links and/or nodes are examined starting at the source (or destination) node and progressing along the best links and/or nodes until the destination (or source) node is reached.

Prior art methods of route selection for an alternate path do not take into consideration the resources reserved for the current communications path. This is limiting because if there is a link and/or node in the network through which :both the current and the alternate communications path need to pass, but there are not enough resources on that link and/or node for both paths, then this link and/or node cannot be selected by the basic method. Suppose, a link of capacity 900 Kbits/s has 100 Kbits/s of unreserved bandwidth, and also carries the current communications path which reserves at least 100 Kbits/s. This link will not be selected by the prior art methods when computing an alternate communications path requiring 200 Kbits/s because this link has only 100 Kbits/s of unreserved bandwidth.

Accordingly, there is a need for a method of route selection for an alternate communications path which makes efficient use of the network resources by taking into account the resources used by the current path.

SUMMARY OF THE INVENTION

The present invention seeks to overcome the disadvantages of the prior art associated with route selection for path optimization and modification, in particular within the context of "make-before-break".

According to one aspect of the invention a mechanism for route selection in connection-oriented packet-switching networks in which data packets are transmitted on a current communications path, is provided. An optimization entity generates a request for an alternate communications path. Whenever the request for route selection includes the network resources reserved by the current communications path, the alternate communications path is computed considering the network resources reserved by the current communications path as available, in addition to the available network resources in the topology database.

According to another aspect of the invention, after a request for an alternate communications path, whenever the request contains information regarding the network resources used by the current communications path, the mechanism for route selection in connection-oriented packet-switching networks removes network resources reservations associated with the current communications path from the network topology database, computes the alternate communications path based on information accessed from the network topology database, and finally restores the network topology database to reflect again the network resources reservations used by the current communications path.

Advantageously, the method of route selection according to the invention provides an efficient utilization of resources in connection-oriented networks since it is based on a realistic network resources allocation and connection management. The capacity of the network is increased by allowing for more connection-oriented services to be deployed in the network, thus improving the network utilization.

The "Summary of the Invention" does not necessarily disclose-all the features essential for defining the invention. The invention may reside in a sub-combination of the disclosed features.

BRIEF DESCRIPTION OF THE DRAWING

The invention will be now explained by way of example only and with reference to the attached drawings.

Similar reference numerals are used in different figures to denote similar parts.

DETAILED DESCRIPTION OF THE PREFERRED EMBODIMENTS

The following description is of a preferred embodiment by way of example only and without limitation to combination of features necessary for carrying the invention into effect.

Figure 2:
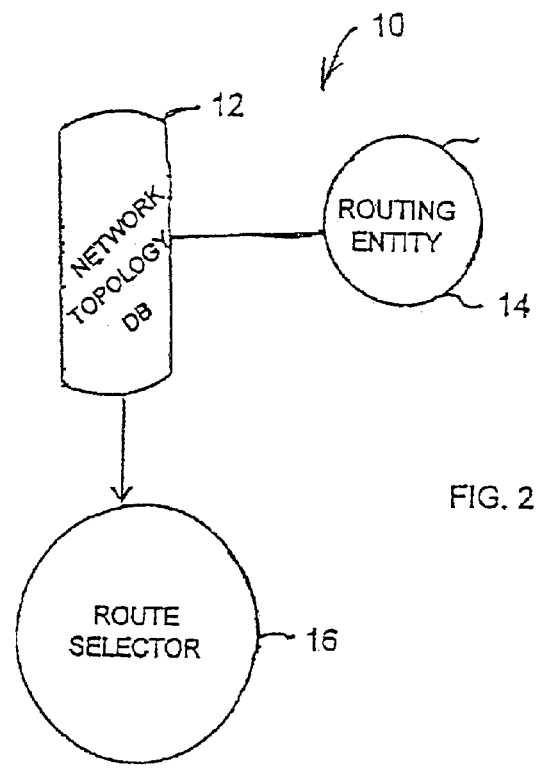
FIG. 2 illustrates a routing system for implementing the method of the present invention.

As illustrated in FIG. 2, a routing system 10 includes network topology database 12, a routing entity 14, and a route selector 16. Database 12 receives link and/or node resources availability or reservation information via routing updates managed by the routing entity 14. Database 12 supplies information regarding the available, or the reserved network resources to the route selector 16 for-route selection.

Route selector 16 selects the best possible route for an alternate communications path, which may or may not use the same links and/or nodes as the current communications path. Whenever a link and/or node is considered for selection and that link and/or node also carries the current communications path, the network resources reserved by the current communications path are made available for the computation of the alternate communications path.

The topology database 12 stores in general the network resources such as bandwidth, memory, CPU, information for all links and/or nodes. The information may contain the amount of available network resources, or the amount of reserved network resources on all links and/or nodes in an aggregate format. That is, the total amount of network resources reserved by all network connections is known, and not on a per connection network resources reservations. Alternatively, the total amount of available network resources is known. This allows the use of a network topology database 12 of a manageable size.

Throughout the description a link is the physical connection between two nodes. A route is the end-to-end connection between two nodes and specifies the links used to perform communications. A communications path is a connection between a source and a destination node, and is also defined by the network resources allocated to this connection. The network resources are for example the bandwidth, memory, CPU on links and/or nodes.

The route selection process is typically based on Dijkstra shortest path first algorithm for computing the best route between source and destination. As mentioned before, according to the invention the algorithm is modified to account for the network resources reservations, and the set of links and/or nodes used by the current communications path.

Alternatively, the topology database 12 can be initially modified by removing the network resources reservations for the current communications path on links and/or nodes used by this current communications path. Secondly, the best possible route between source and destination for the alternate communications path is computed by the route selector 16. This alternate route, if found, may require the same amount of network resources, e.g path optimization, or a different amount of network resources, e.g. path modification. The computation is done using the known algorithm. The entry data are retrieved from the topology database 12. Thirdly, the topology database 12 is restored to reflect again the network resources reservations on links and/or nodes used by the current communications path. The three steps above are performed as an "atomic transaction".

"Atomic transaction" implies that a particular succession of steps are executed as an uninterrupted cycle by the route selection process. That is, while the three steps described above are being executed by the route selector 16, no subsequent route selection request is admitted. In addition, the topology database 12 on which the route selection process operates can not be modified by-any other process until last step is completed. It is to be noted that the algorithm of route selection does not require modification if this approach is chosen.

Figure 1:
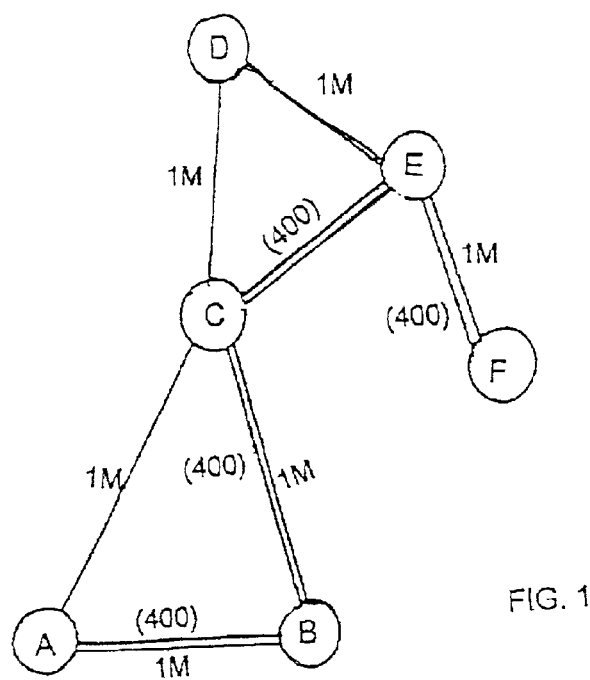
FIG. 1 illustrates a portion of a wide area network (prior art)

Referring to the example of FIG. 1, a prior art route selection process operating on that particular network would not be able to select a route which includes any of the links AB, BC, CE, and/or EF, as they only have 400 Kbits/s of bandwidth available and the alternate path requires 600 Kbits/s. The path optimization mechanism would not learn about the existence of the more optimal route AC, CE, EF, resulting in the connection remaining along the less optimal current path AB, BC, CE, EF. That is, the path optimization process for this connection fails to reroute the path from a less optimal route to a more optimal route.

The route selection process according to the invention, allows the selection of a more optimal route for the alternate path between a source node and a destination node, by considering the network resources reservations allocated to the current communications path, in particular what links and/or nodes are used by the current communications path and what amount of resources are reserved on these links and/or nodes. Thus, whenever a link and/or node is considered for selection and this link and/or node also carries the current communications path, the network resources a reserved by the current communications path are considered as available for the computation of the alternate communications path. Two mechanisms for route selection for alternate communications paths in connection-oriented networks are presented in FIGS. 3 and 4, according to the invention.

Figure 3:
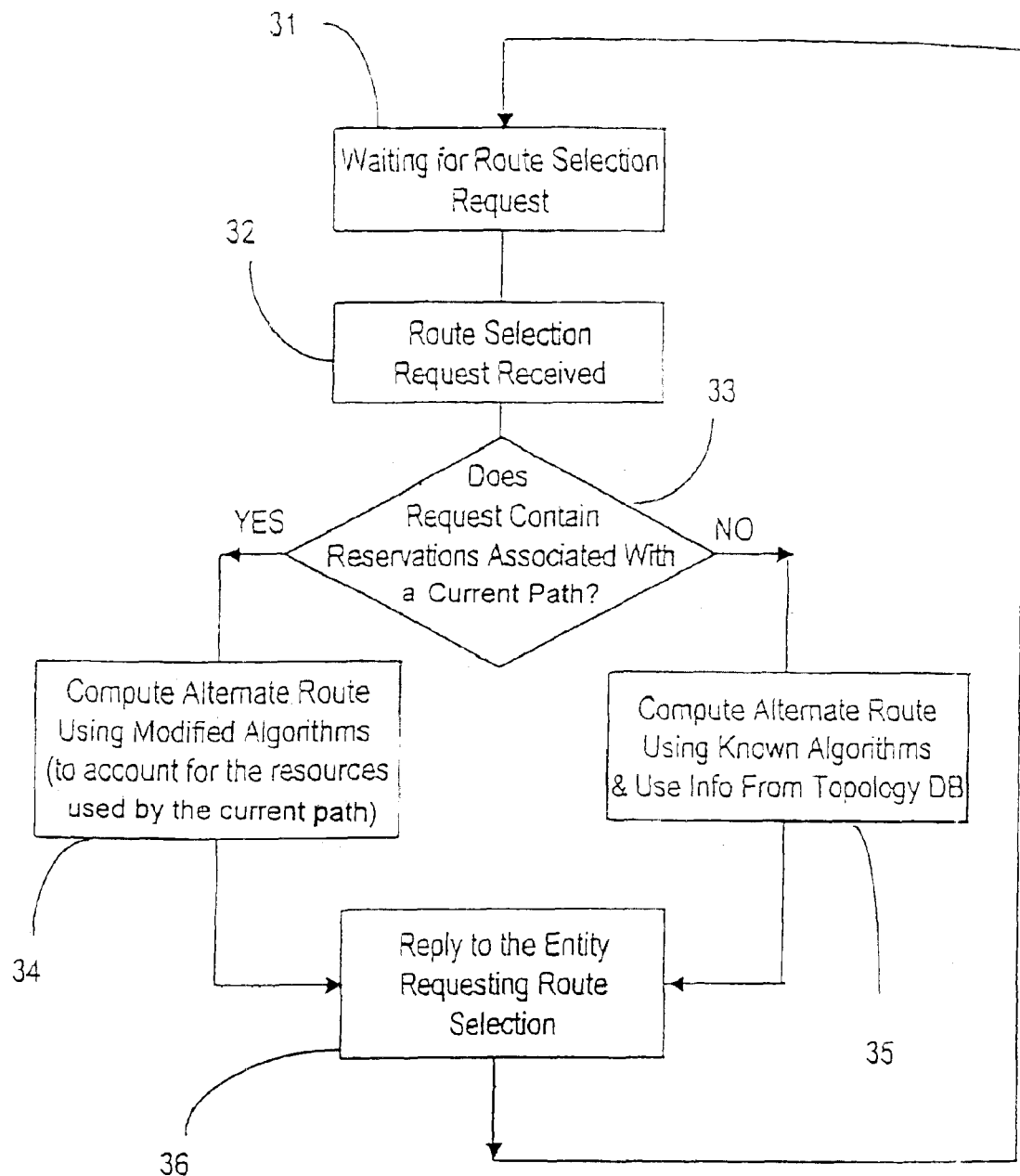
FIG. 3 is a flow chart illustrating the route selection process implemented according to one embodiment of the invention.

Referring to FIG. 3, the route selection process waits for a route selection request at step 31. At step 32 a route selection request arrives. The arrival of the request may be time-driven or event-driven. At step 33 it is determined whether or not the request contains information about a current communications path. If present, this information includes links and/or nodes used by the current path, and the amount of resources reserved on these links and/or nodes. This information may be represented as a tuple <RESOURCES_USED, LINKS&NODES_USED>.

If the information about a current communications path is contained in the request, the best possible route for an alternate communications path is calculated, step 34, by considering the network resources reserved by the current communications path as available, in addition to the available network resources in the topology database.

If the information about a current communications path is not contained in the request, the best route for an alternate path is calculated, step 35, using the information available in the topology database.

At step 36 the route selection process replies to the entity, e.g. an optimization entity, which initially requested the route selection. The reply may, or may not contain an alternate route depending on whether the route selection process has found, or not found the alternate route. After replying, the route selection process returns to step 31 to wait for the next route selection request.

Figure 4:
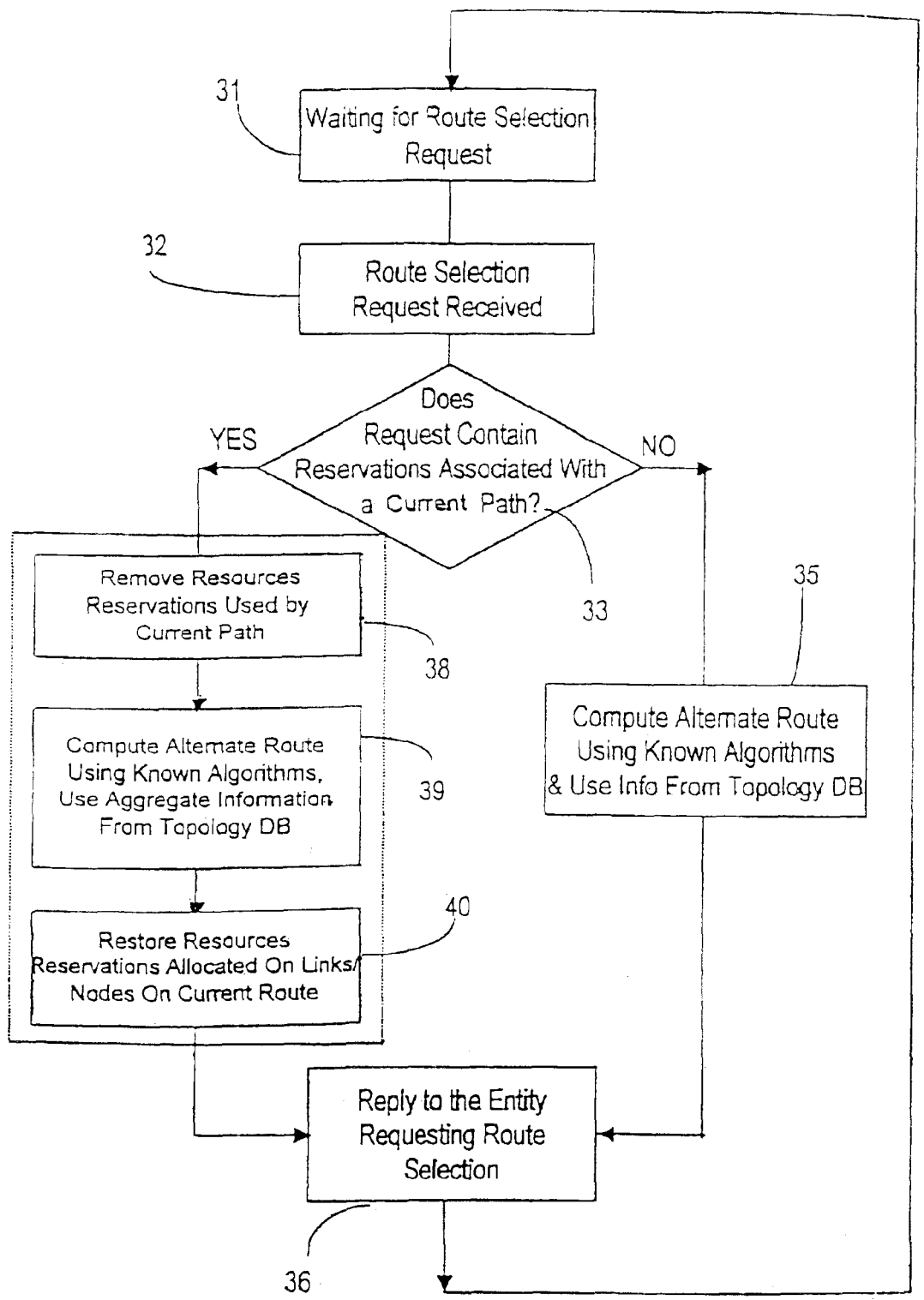
FIG. 4 is a flow chart illustrating the route selection process implemented according to another embodiment of the invention.

FIG. 4 is a flow chart illustrating a route selection process according to another embodiment of the invention. In FIG. 4, steps 38, 39 and 40, performed as an "atomic transaction", are replacing step 34 of FIG. 3.

At step 38, the topology database is modified by removing the network resources reservations allocated to the current communications path on links and/or nodes used by this current communications path.

The best possible route between source and destination for an alternate communications path is computed at step 39. The alternate communications path if found, may require the same amount of network resources, or a different amount of network resources when compared to the resources reserved by the current communications path. The computation is done using the known algorithm.

At step 40, the topology database is restored to reflect again the resources reservations on links and/or nodes used by the original communications path.

It is to be noted that step 39 of FIG. 4 is identical to step 35 of FIG. 3 since they perform identical function leaving the algorithm intact and using the information available in the topology database.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and the actions can be performed by a programmable processor executing a program of instructions by operating on input data and generating output.

The invention can be implemented advantageously in one or more computer programs that are executable on a programmable system including at least one programmable processor coupled to receive data and instructions from, and to transmit data and instructions to, a data storage system, at least one input device , and at least on output device. Each program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory.

Generally, the system will include one or more mass storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the forgoing can be supplemented by, or incorporated in, ASICs (application-specific integrated circuits).

The choice of the method for route selection depends on how the algorithm of route selection process is implemented. If it is implemented in hardware then its modification may be impossible and thus, the method of FIG. 4 may be the only alternative. If the algorithm is implemented in software then either method can be considered and the one which would perform better should be finally chosen.

It is understood that the route selection mechanism according to the invention, is used when (a) the original communications path and the alternate path would not simultaneously carry data (which is the case for path optimization and modification); and (b) a process administering the common links and/or nodes can correlate the alternate communications path to the original communications path by performing appropriate network resources reservations between source and destination for avoiding multiple bookings. Such a mechanism is disclosed by Nortel in U.S. Pat. No. 5,848,055 which is incorporated herein by reference.

A process for selecting the best possible route for an alternate communications path in connection-oriented networks takes into account the reserved network resources and the set of links and/or nodes used by a current communications path. Whenever a request for route selection includes the network resources reserved by the current communications path, the alternate communications path is computed considering the network resources reserved by the current communications path as available, in addition to the available network resources in the topology database.

In another embodiment of the invention, the topology database is initially modified such that the network resources reservations used by the current communications path are removed from the topology database. The alternate communications path is then computed. Finally, the topology database is restored to reflect again the network resources reservations used by the current communications path.

The method according to the invention improves network utilization since it is based on a realistic network resources allocation and connection management. The capacity of the network is increased allowing for more connection-oriented services to be deployed in the network.

Numerous modifications, variations, and adaptations may be made to the particular embodiments of the invention without departing from the scope of the invention which is defined in the claims.

What is claimed is:

1. A method for path optimization and modification in connection-oriented packet-switching network, said method comprising the steps of:
   a) receiving a request for selecting an alternate communications path, said request containing information regarding the network resources used by a current communications path, said current communications path being in a non-failure state, and transmitting data packets;
   b) supplementing the resources available in said network with said network resources used by said current communications path; and
   c) computing the alternate communications path.

2. The method of claim 1, wherein said network resources include bandwidth, CPU, memory, links/nodes.

3. The method of claim 2, wren said alternate communications path uses a bandwidth, CPU and memory which are not greater than the bandwidth, CPU and memory used by said current communications path.

4. The method of claim 2, wherein said alternate communications path uses a bandwidth, CPU and memory which are greater than he bandwidth, CPU and memory used by said current communications path.

5. The method of claim 1, wherein said stop of computing said alternate communications path includes using information from a network topology database.

6. The method of claim 3 or 4, wherein said alternate path includes a link used by said current communications path.

7. A method for path optimization and modification in connection-oriented packet-switching networks, said method comprising the steps of:
   a) receiving a request for selecting an alternate communications path, said request containing information regarding network resource reservations used by a current communications path, said current communications path being in a non-failure state, and transmitting data packets;
   b) removing said network resources reservations used by said current communications path from a network topology database;
   c) computing said alternate communications path based on information accessed from said network topology database; and
   d) restoring said network topology database to reflect again said network resources reservations used by said current communications path.

8. The method of claim 7, wherein sub-steps (b) to (d) are performed as an atomic transaction.

9. The method of claim 7, wherein said network resources include bandwidth, CPU, memory, links/nodes.

10. The method of claim 9, wherein said alternate communications path uses a bandwidth, CPU and memory which are not greater than the bandwidth, CPU and memory used by said current communications path.

11. The method of claim 9, wherein said alternate communications path uses a bandwidth, CPU and memory which are greater than the bandwidth, CPU and memory used by said current communications path.

12. The method of claim 10 or 11, wherein said alternate path includes a link used by said current communications path.

13. A route selector for path optimization and modification in connection-oriented packet-switching networks, said route selector comprising:
   means for receiving a request for selecting an alternate communications path, said request containing information regarding the network resources used by a current communications path, said current communications path being in a non-failure state and transmitting data packets;
   means for supplementing the resources available in said network with said network resources used by said current communications path; and
   means for computing said alternate communications path.

14. The route selector of claim 13, wherein said network resources include bandwidth, CPU, memory, links/nodes.

15. The route selector of claim 14, wherein said alternate communications path uses a bandwidth, CPU and memory which are not greater than the bandwidth, CPU and memory used by said current communications path.

16. The route selector of claim 14, wherein said alternate communications path uses a bandwidth, CPU and memory which are greater than the bandwidth, CPU and memory used by said current communications path.

17. The route selector of claim 14 or 15, wherein said alternate path includes a link used by said current communications path.

18. A route selector for selecting an alternate communications path in connection-oriented packet-switching networks, said route selector comprising:
  means for receiving a request for selecting an alternate communications path, said request containing information regarding the network resources reservations used by a current communications path, said current communications path being in a non-failure state transmitting data packets;
  means for removing said network resources reservations used by said current communications path from a network topology database;
  means for computing said alternate communications path based on information accessed from said network topology database; and
  means for restoring said network topology database to reflect again said network resources reservations used by said current communications path.

19. The route selector of claim 18, wherein said network resources include bandwidth, CPU, memory, links/nodes.

20. The route selector of claim 18, wherein said alternate communications path uses a bandwidth, CPU and memory which are not greater than the bandwidth, CPU and memory used by said current communications path.

21. The route selector of claim 19, wherein said alternate communications path uses a bandwidth, CPU and memory which are greater than the bandwidth, CPU and memory used by said current communications path.

22. The route selector of claim 20 or 21, wherein said alternate path includes a link used by said original communications path.

23. A computer-readable medium containing computer executable instructions for performing path optimization and modification, comprising the steps of:
  a) receiving a route selection request for finding an alternate communications path in connection-oriented packet-switching networks in which data packets are transmitted on a current communications path, said current communications path being in a non-failure state, said request containing information regarding the network resources reservations used by said current communications path; and
  b) computing said alternate communications path after increasing the resources available in said network with said network resources reservations used by said current communications path.

24. The computer-readable medium of claim 23, wherein step (b) includes the following sub-steps:
  b1) removing said network resources used by said current communications path from a network topology database;
  b2) computing said alternate communications path based on information accessed from said network topology database; and
  b3) restoring said network topology database to reflect again said network resources reservations used by said current communications path.

25. The computer-readable medium of claim 24, wherein said sub-steps (b1) to (b3) are performed as an atomic transaction.

26. The computer-readable medium of claim 23, wherein said network resources include bandwidth, CPU, memory, links/nodes.

27. The computer-readable medium of claim 26, wherein said alternate communications path uses a bandwidth, CPU and memory which are not greater than the bandwidth, CPU and memory used by said current communications path.

28. The computer-readable medium of claim 26, wherein said alternate communications path uses a bandwidth, CPU and memory which are greater than the bandwidth, CPU and memory used by said current communications path.

29. The computer-readable medium of claim 27 or 28, wherein said alternate path includes a link used by said current communications path.

* * * * *